(12) United States Patent
Cho

(10) Patent No.: US 8,201,671 B2
(45) Date of Patent: Jun. 19, 2012

(54) IMPACT ABSORPTION PLATE AND MANUFACTURING METHOD THEREOF

(75) Inventor: Min Ho Cho, Daegu-si (KR)

(73) Assignee: Hyundai Motor Company, Seoul (KR)

( * ) Notice: Subject to any disclaimer, the term of this patent is extended or adjusted under 35 U.S.C. 154(b) by 806 days.

(21) Appl. No.: 12/325,118

(22) Filed: Nov. 28, 2008

(65) Prior Publication Data

US 2009/0272612 A1 Nov. 5, 2009

(30) Foreign Application Priority Data

Apr. 30, 2008 (KR) .................. 10-2008-0040705

(51) Int. Cl.
*F16F 7/12* (2006.01)
(52) U.S. Cl. ............ 188/377; 267/139; 296/187.05
(58) Field of Classification Search .......... 188/371, 188/377; 267/136, 139, 140, 153; 293/120, 293/133; 296/187.05; 403/263–269
See application file for complete search history.

(56) References Cited

U.S. PATENT DOCUMENTS

| | | | |
|---|---|---|---|
| 3,008,702 A * | 11/1961 | Breneman ............... 267/153 |
| 3,546,055 A * | 12/1970 | Spertus .................. 428/52 |
| 3,933,387 A * | 1/1976 | Salloum et al. ........... 293/120 |
| 4,766,998 A * | 8/1988 | Russell ................ 206/564 |
| 4,836,379 A * | 6/1989 | Shaw .................. 206/523 |
| 5,030,501 A * | 7/1991 | Colvin et al. ............ 428/178 |
| 5,251,414 A * | 10/1993 | Duke .................. 52/309.16 |
| 5,399,406 A * | 3/1995 | Matsuo et al. ............. 428/57 |
| 5,507,540 A * | 4/1996 | Pernot ................. 293/102 |
| 5,551,673 A * | 9/1996 | Furusawa et al. .......... 267/160 |
| 6,199,942 B1 | 3/2001 | Carroll, III et al. |
| 6,247,745 B1 | 6/2001 | Carroll, III et al. |
| 6,270,131 B1 * | 8/2001 | Martinez et al. .......... 293/132 |
| 6,443,513 B1 * | 9/2002 | Glance ................. 293/133 |
| 6,681,907 B2 * | 1/2004 | Le .................... 188/371 |
| 6,682,128 B2 | 1/2004 | Carroll, III et al. |
| 6,863,322 B2 * | 3/2005 | Hunter et al. ............ 293/120 |
| 7,625,023 B2 * | 12/2009 | Audi et al. ............. 293/134 |
| 2003/0075953 A1 * | 4/2003 | Hirota et al. ............ 296/189 |
| 2005/0088011 A1 * | 4/2005 | Suzuki et al. ........... 296/187.03 |
| 2005/0133324 A1 | 6/2005 | Soto Bailon et al. |
| 2007/0267261 A1 * | 11/2007 | Toccalino et al. .......... 188/377 |
| 2009/0072557 A1 * | 3/2009 | Roddy et al. ............ 293/120 |
| 2009/0159384 A1 * | 6/2009 | Chitteti et al. ........... 188/377 |

* cited by examiner

*Primary Examiner* — Bradley King
*Assistant Examiner* — Nicholas J Lane
(74) *Attorney, Agent, or Firm* — Morgan, Lewis & Bockius LLP

(57) ABSTRACT

An impact absorption plate for absorbing impact in the event of a vehicle crash and a method of manufacturing the impact absorption plate includes a base plate and a plurality of bosses. The base plate has on an upper surface thereof a patterned rib unit. Each boss has fitting notches into which the patterned rib unit is fitted, and has the shape of a truncated cone which is open at a bottom thereof. Thus, when it is required to change the structure of the impact absorption plate, the removable bosses may be rearranged on the base plate as desired.

10 Claims, 3 Drawing Sheets

IMPACT ABSORPTION PLATE AND MANUFACTURING METHOD THEREOF

CROSS-REFERENCE TO RELATED APPLICATIONS

The present application claims priority of Korean Patent Application Number 10-2008-0040705 filed Apr. 30, 2008, the entire contents of which application is incorporated herein for all purposes by this reference.

BACKGROUND OF THE INVENTION

1. Field of the Invention

The present invention relates to an impact absorption plate for absorbing impact energy so as to protect a passenger or a driver in the event of a vehicle crash, and to a method of manufacturing the impact absorption plate.

2. Description of Related Art

As well known to those skilled in the art, impact absorbers, having various materials and structures, have been used to absorb impact energy. These impact absorbers are made of various materials, including fabric, foam, and plastics.

Particularly, in order to protect a passenger or a driver of a vehicle in the event of a vehicle crash, impact absorbers having various structures have been proposed and used in vehicles. Earlier patent disclosures dealing with the impact absorbers are found in U.S. Pat. No. 6,199,942 (Mar. 13, 2001), U.S. Pat. No. 6,247,745 (Jun. 19, 2001), U.S. Pat. No. 6,682,128 (Jan. 27, 2004), etc.

For example, a conventional impact absorber is constructed so that a plurality of protrusions is provided on a seat, and walls of the protrusions are partially compressed when energy is absorbed, thus absorbing impact.

The conventional impact absorber is manufactured to have a different shape according to impact characteristics or impact space, and is manufactured so that the seat and the protrusions are integrated into a single structure through a mold. Thus, when it is required to change the construction of the impact absorber so as to improve the performance thereof, the mold must be modified, or a new mold must be manufactured. Therefore, the conventional impact absorber is problematic in that an excessively high investment is required, and the number of assembly processes is increased, so that work efficiency is low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide for an impact absorption plate which can be used universally without modifying a mold even when it is required to change the construction thereof, and a method of manufacturing the impact absorption plate.

In an aspect of the present invention, an impact absorption plate may include a base plate having on an upper surface thereof a patterned rib unit, and/or a boss fitted over the patterned rib unit to absorb the impact of the vehicle crash.

The base plate may be flexible.

The boss may have a fitting notch at lower end portion thereof, is fitted over and coupled to the patterned rib unit through the fitting notch.

The boss may have a shape of a truncated cone which is open at a bottom thereof.

The patterned rib unit may include horizontal and vertical patterned ribs and arranged to form intersections with a predetermined angle therebetween on the upper surface of the base plate. The horizontal and vertical patterned ribs of the patterned rib unit may be in a matrix form.

A plurality of the bosses may be fitted over the patterned rib unit to absorb the impact of the vehicle crash. The plurality of the bosses may have different sizes so as to prevent the bosses from interfering with adjacent components. The plurality of bosses may be disposed at the intersections of the horizontal and vertical patterned ribs of the patterned rib unit. The plurality of the bosses may be coupled to each other via a coupling rib unit, thus constituting a single boss module. A rib insert hole may be formed in the fitting notch of the bosses so that the coupling rib unit and the patterned rib unit are inserted into the rib insert hole together. The coupling rib unit may include horizontal and vertical coupling ribs arranged to form intersections therebetween with a predetermined angle therebetween. The horizontal and vertical coupling ribs of the coupling rib unit may be in a matrix form.

In another aspect of the present invention, a method of manufacturing an impact absorption plate for absorbing impact in a vehicle crash, may include manufacturing a base plate having a patterned rib unit, manufacturing a plurality of bosses each having a fitting notch at a lower end portion thereof, and/or assembling the base plate with the plurality of bosses by fitting the patterned rib unit into the fitting notch.

In further another aspect of the present invention, a method of manufacturing an impact absorption plate for absorbing impact in a vehicle crash, may include manufacturing a base plate having a patterned rib unit, manufacturing a plurality of bosses each having a fitting notch and a rib insertion hole at a lower end portion thereof, coupling the plurality of the bosses each other using a coupling rib unit through the rib insertion hole, thus producing a single boss module, and/or assembling the base plate with the single boss module by fitting the patterned rib unit into the fitting notch of the plurality of bosses.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
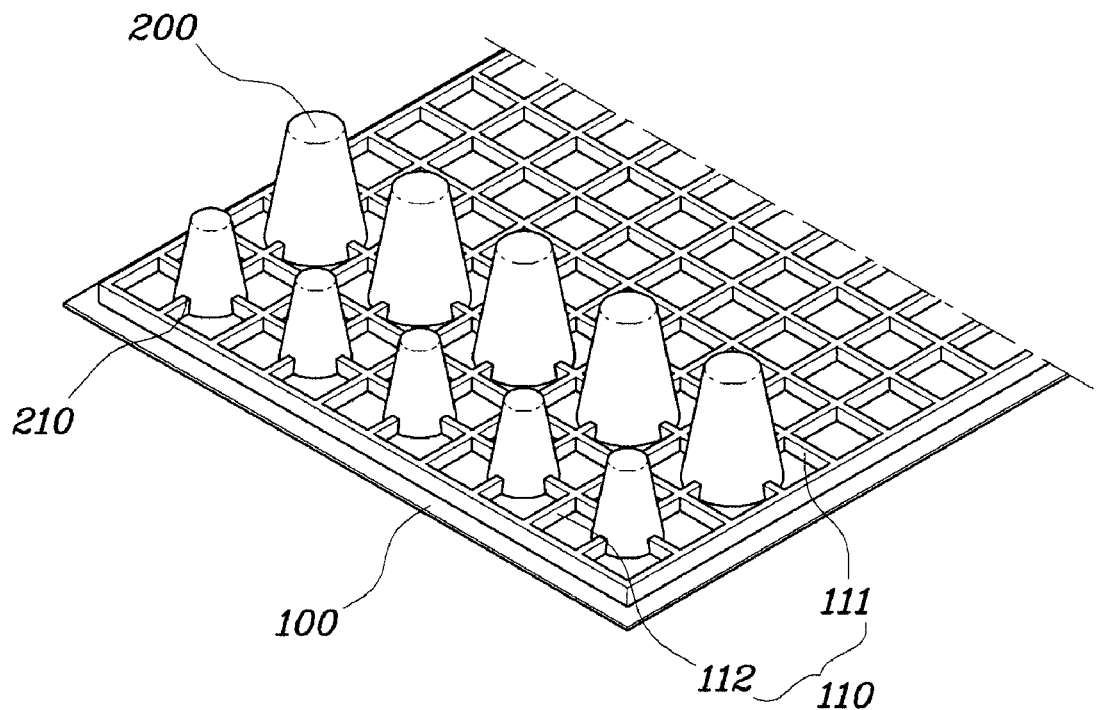
FIG. 1 is a perspective view illustrating an exemplary impact absorption plate according to the present invention.
Figure 2:
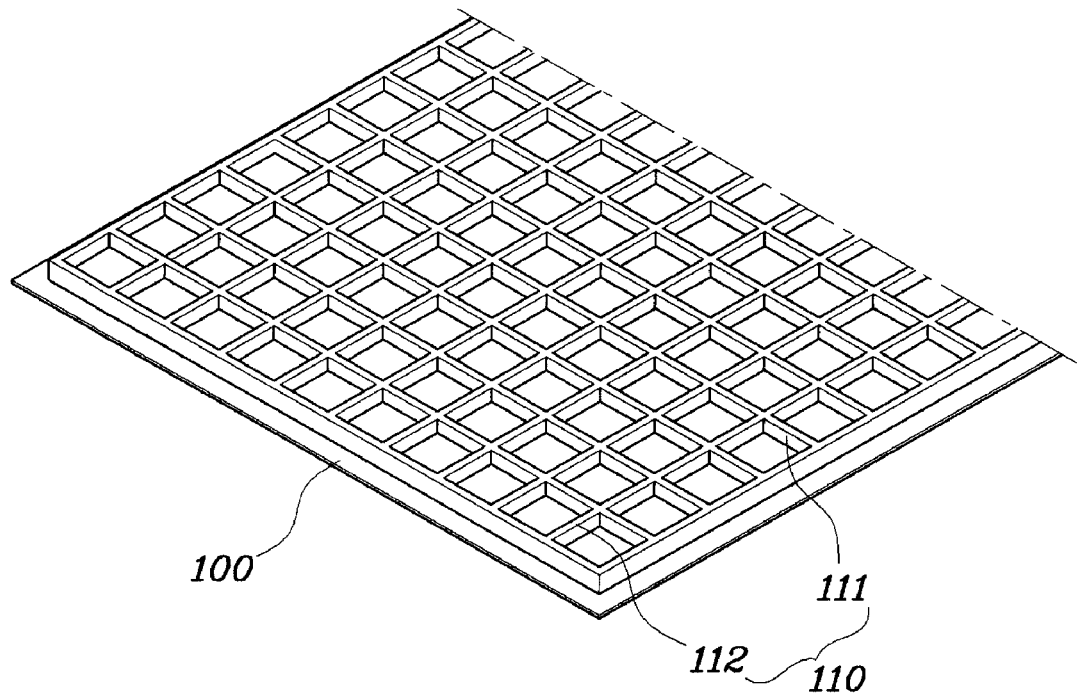
FIG. 2 is a view illustrating the construction of an exemplary base plate of the impact absorption plate according to the present invention.
Figure 3:
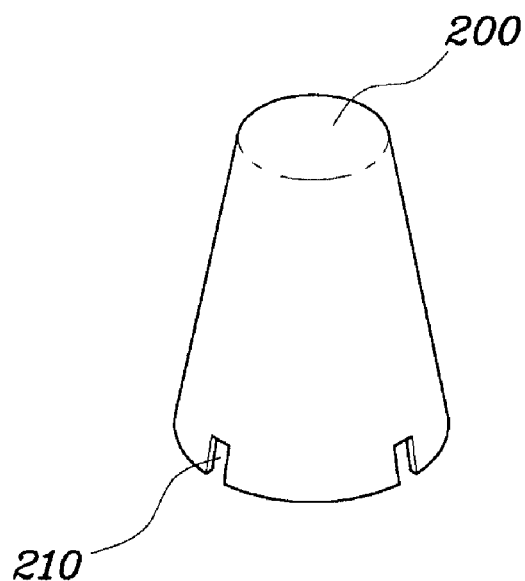
FIG. 3 is a perspective view illustrating an exemplary boss of the impact absorption plate according to the present invention.

As shown in FIGS. 1 to 3, an impact absorption plate according to various exemplary embodiments of the present invention is constructed so that a plurality of removable bosses is selectively connected to a base plate.

An impact absorption plate according to various embodiments of the present invention includes the base plate 100, a patterned rib unit or pattern rib unit 110, and the plurality of bosses 200 which are fitted over the pattern rib unit 110.

The base plate 100 is made of a flexible material, and is installed in portion of a vehicle at which it is required to absorb an impact in the event of a vehicle crash. For example, the base plate 100 may be mounted to a headliner of a vehicle, an A filler, a B filler, a door trim panel, etc.

The pattern rib unit 110 protrudes from the upper surface of the base plate 100 in a predetermined pattern. This pattern rib unit 110 includes horizontal patterned ribs or pattern ribs 111 and vertical patterned ribs or pattern ribs 112 which are alternately arranged, so that the pattern rib unit 110 is provided on the upper surface of the base plate 100 in a matrix form.

According to various embodiments, the pattern rib unit 110 has the form of a matrix. However, the pattern rib unit 110 may be arranged on the upper surface of the base plate 100 in various forms in consideration of the position at which impact occurs and interference with peripheral parts, without being limited to the matrix form.

The plurality of bosses 200 is fitted over the pattern rib unit 110. Each boss 200 has the shape of a truncated cone which is open at the bottom thereof. Fitting notches 210 are formed in the lower end of the boss 200 to be fitted over the pattern rib unit 110. In various embodiments of the present invention, accordingly the thickness of the pattern rib unit 110 may be the same has the height for fitting notch 210.

The impact absorption plate includes the plurality of bosses 200, which have standardized height and diameter and are selectively fitted over the pattern rib unit 110 of the base plate 100.

Each boss 200 may be fitted over and be coupled to the pattern rib unit 110. The position of the bosses 200 which are fitted over the pattern rib unit 110 may be adjusted in consideration of the position in a vehicle where impact occurs. That is, various forms of impact absorption plates may be manufactured according to how the bosses 200 are arranged on the base plate 100.

The bosses 200 may be removably fitted over the pattern rib unit 110 of the base plate 100. Thus, when it is required to change the structure of the impact absorption plate, the bosses 200, which are fitted over the pattern rib unit 110 as described above, may be removed from the pattern rib unit 110, and then may be rearranged on the base plate 100.

In contrast, in the case of a conventional impact absorption plate integrally having bosses and a base plate through a mold, the mold must be modified or a new mold must be manufactured according to the mounted position or change in structure of the impact absorption plate.

However, the impact absorption plate according to various embodiments of the present invention requires only that the bosses 200 be rearranged on the base plate 100, thus preventing physical and economic waste.

The plurality of bosses 200 may have different sizes so as to prevent the bosses 200 from interfering with adjacent components when the impact absorption plate is mounted. That is, a boss 200, which is so near that the boss 200 interferes with the components, is constructed to be smaller than other bosses 200. This construction is devised in consideration of the layout of parts installed around the impact absorption plate.

The plurality of bosses 200 may be arranged on the pattern rib unit 110 in the matrix form. This matrix form is obtained by arranging the bosses 200 compactly so as to efficiently absorb impact.

Figure 4:
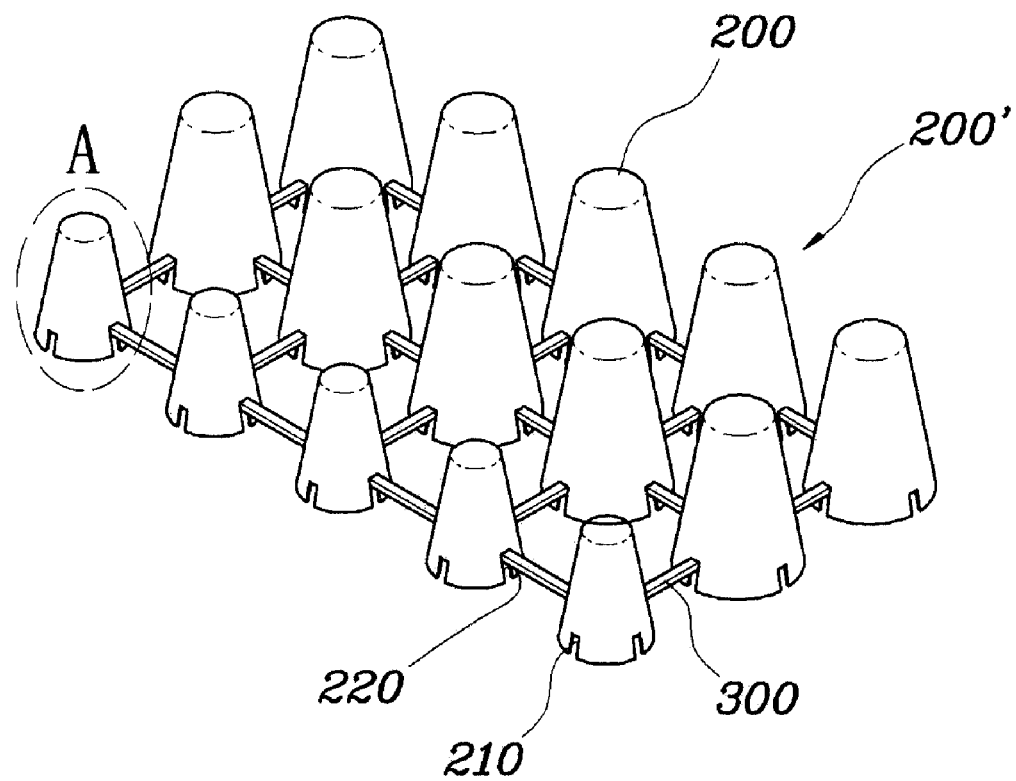
FIG. 4 is a view illustrating the construction of an exemplary boss module of an impact absorption plate according to the present invention.
Figure 5:
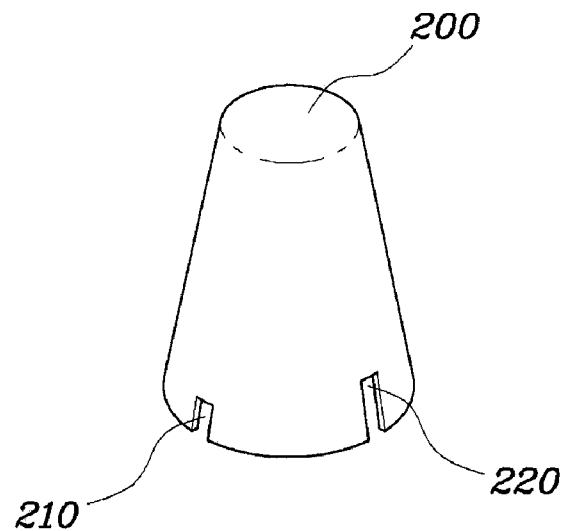
FIG. 5 is an enlarged view illustrating the construction of portion "A" of FIG. 4.
Figure 6:
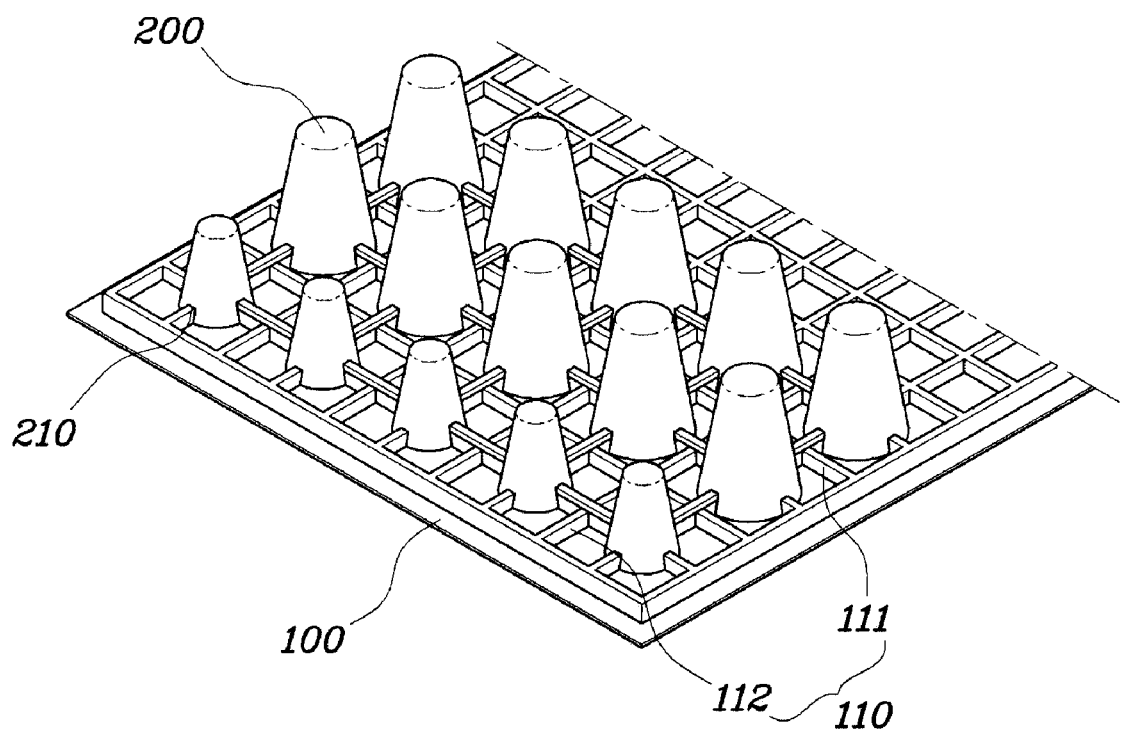
FIG. 6 is a perspective view illustrating an exemplary impact absorption plate according to the present invention.

As shown in FIGS. 4 to 6, an impact absorption plate according to various embodiments of the present invention includes a base plate 100 and a plurality of bosses 200. The base plate 100 has a pattern rib unit 110. The bosses 200 are fitted over the pattern rib unit 110 and are coupled to each other via a coupling rib unit 300, thus constituting a single boss module 200'. Accordingly the bosses 200 is more strongly reinforced by the coupling rib unit 300. Since the base plate 100 of FIGS. 4 and 5 has the same construction as the base plate 100 of FIGS. 1-3, it will not be described herein.

Each boss 200 has the shape of a truncated cone which has fitting notches 210 fitted over the pattern rib unit 110. The bosses 200 are coupled to each other via the coupling rib unit 300 through the rib insertion hole 220. The coupling rib unit 300 passes through the fitting notches 210 in the bosses 200 so that the bosses 200 are coupled to each other. Here, rib insert holes 220 are formed in the fitting notches 210 so that the coupling rib unit 300 is inserted into the rib insert holes 220. The height of the rib insertion hole 220 is larger than that of the fitting notch 210 so that the coupling rib unit 300 can be overlapped on the pattern rib unit 110 through the rib insertion hole 220.

The coupling rib unit 300 includes horizontal coupling ribs which couple horizontally adjacent bosses 200 to each other, and vertical coupling ribs which couple vertically adjacent bosses 200 to each other. The horizontal ribs and the vertical ribs are arranged in a matrix form, thus forming a single boss module 200'.

As such, the boss module 200', which is obtained by coupling the plurality of bosses 200 to each other using the coupling rib unit 300, may be manufactured through a mold. The boss module 200' manufactured in this way is connected to the pattern rib unit 110 of the base plate 100, thus providing the impact absorption plate. The boss module 200' may be fitted over and adhere to the pattern rib unit 110.

According to various embodiments, the coupling rib unit 300 passes through the rib insert holes 220 in the bosses 200. However, a single boss module 200' may be obtained by coupling sidewalls of the bosses 200 to each other using a plurality of coupling ribs 300.

Meanwhile, the method of manufacturing the impact absorption plate according to various embodiments is as follows. That is, the base plate 100 having the pattern rib unit 110 and the plurality of bosses 200 having the fitting notches 210 are separately manufactured. The pattern rib unit 110 is fitted into the fitting notches 210, so that the base plate 100 and the plurality of bosses 200 are assembled with each other.

Here, the plurality of bosses 200 may be arranged on the base plate 100 in various forms. Preferably, the bosses 200 may be arranged in a matrix form. The bosses 200 may be secured to the base plate 100 through adhesion.

The method of manufacturing the impact absorption plate according to other embodiments is as follows. That is, the base plate 100 having the pattern rib unit 110 and the plurality of bosses 200 having the fitting notches 210 are manufactured separately. The bosses 200 are coupled to each other via the coupling rib unit 300, thus providing a single boss module 200'. Here, the boss module 200' is obtained by arranging the plurality of bosses 200 in the matrix form.

When the boss module 200' has been assembled, the assembled boss module 200' is fitted over the pattern rib unit 110, so that the base plate 100 and the boss module 200' are coupled to each other. Here, the base plate 100 and the boss module 200' may be coupled to each other through adhesion.

As described above, the present invention is advantageous in that bosses having desired sizes can be secured at predetermined positions on a base plate, so that the bosses are arranged on the base plate in various shapes.

Further, the present invention is advantageous in that removable bosses are rearranged on a base plate when it is required to change the structure of an impact absorption plate, thus obviating the necessity to modify a mold or manufacture a new mold, therefore preventing physical and economic waste.

Furthermore, the present invention is advantageous in that it is possible to assemble bosses, which are standardized and universally used, in start and mass-production development stages, so that the mold cost is reduced in start or mass-production development stages, and the number of assembly processes is reduced, thus reducing the cost of a product.

For convenience in explanation and accurate definition in the appended claims, the terms "upper", or "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An impact absorption plate for absorbing impact in a vehicle crash, comprising:
   a base plate having on an upper surface thereof a patterned rib unit; and
   wherein the patterned rib unit comprises horizontal and vertical patterned ribs and arranged to form intersections with a predetermined angle therebetween on the upper surface of the base plate,
   wherein a plurality of bosses are fitted over the patterned rib unit to absorb the impact of the vehicle crash,
   wherein the plurality of the bosses are coupled to each other via a coupling rib unit, thus constituting a single boss module, and
   wherein a rib insert hole is formed on the bosses so that the coupling rib unit and the patterned rib unit are inserted into the rib insert hole together.

2. The impact absorption plate as set forth in claim 1, wherein the base plate is flexible.

3. The impact absorption plate as set forth in claim 1, wherein the boss has a fitting notch at lower end portion thereof, is fitted over and coupled to the patterned rib unit through the fitting notch.

4. The impact absorption plate as set forth in claim 1, wherein the boss has a shape of a truncated cone which is open at a bottom thereof.

5. The impact absorption plate as set forth in claim 1, wherein the horizontal and vertical patterned ribs of the patterned rib unit are in a matrix form.

6. The impact absorption plate as set forth in claim 1, wherein the plurality of the bosses have different sizes so as to prevent the bosses from interfering with adjacent components.

7. The impact absorption plate as set forth in claim 1, wherein the plurality of bosses are disposed at the intersections of the horizontal and vertical patterned ribs of the patterned rib unit.

8. The impact absorption plate as set forth in claim 1, wherein the coupling rib unit comprises horizontal and vertical coupling ribs arranged to form intersections therebetween with a predetermined angle therebetween.

9. The impact absorption plate as set forth in claim 8, wherein the horizontal and vertical coupling ribs of the coupling rib unit are in a matrix form.

10. A passenger vehicle installed with the impact absorption plate as set forth in claim 1.

* * * * *